(12) United States Patent
Wang

(10) Patent No.: US 10,577,003 B2
(45) Date of Patent: Mar. 3, 2020

(54) FRONT-FOLDING GOLF CART

(71) Applicant: Jonathan Wang, Hayward, CA (US)

(72) Inventor: Jonathan Wang, Hayward, CA (US)

(*) Notice: Subject to any disclaimer, the term of this patent is extended or adjusted under 35 U.S.C. 154(b) by 0 days.

(21) Appl. No.: 16/131,318

(22) Filed: Sep. 14, 2018

(65) Prior Publication Data

US 2019/0315383 A1 Oct. 17, 2019

(30) Foreign Application Priority Data

Apr. 17, 2018 (CN) .................. 2018 2 0538695 U

(51) Int. Cl.
*B62B 3/02* (2006.01)
*B62B 3/12* (2006.01)

(52) U.S. Cl.
CPC ............... *B62B 3/022* (2013.01); *B62B 3/12* (2013.01); *B62B 2205/20* (2013.01)

(58) Field of Classification Search
CPC ....... B62B 1/12; B62B 2205/12; B62B 1/002; B62B 3/02; B62B 1/125; B62B 2202/24
See application file for complete search history.

(56) References Cited

U.S. PATENT DOCUMENTS

| 2013/0234418 A1* | 9/2013 | Reimers | B62B 3/02 280/641 |
| 2013/0234420 A1* | 9/2013 | Reimers | B62B 5/085 280/651 |
| 2014/0333049 A1* | 11/2014 | Wu | A63B 55/60 280/651 |
| 2015/0336596 A1* | 11/2015 | Kovacs | B62B 3/001 280/47.371 |

* cited by examiner

*Primary Examiner* — John D Walters
*Assistant Examiner* — James J Triggs
(74) *Attorney, Agent, or Firm* — Maier & Maier, PLLC

(57) ABSTRACT

A front-folding golf cart may include a main rod, a handle, and a front wheel assembly rotatably attached to an end of the main rod. The rotation of the front wheel assembly, from an extended to retracted position, may occur in a forward-and-upward direction. The front wheel assembly may include a front wheel fork having a front wheel mounted thereto, a support chassis extending from the end of the main rod to a connecting portion of the front wheel fork, and a locking mechanism positioned therebetween at the connecting portion. The front wheel fork may fixedly attach to the support chassis, while the connection between the main rod and the supporting chassis may be capable of adjusting in situ. A lower bracket may attach to the support chassis. The front-folding golf cart may further include two rear wheels respectively connected to the main rod through two foldable rear wheel frames.

5 Claims, 3 Drawing Sheets

FRONT-FOLDING GOLF CART

RELATED APPLICATIONS

This application claims priority under 35 U.S.C. § 119 to Chinese Application No. 201820538695.2 filed Apr. 17, 2018, the disclosure of which is incorporated by reference herein in its entirety.

TECHNICAL FIELD

The present invention relates to the technical field of golf carts, and in particular to foldable golf carts.

BACKGROUND

As a primary requirement, the frame of a golf cart should be sufficiently large enough to carry and transport golf bags of various sizes. The upper part and the lower part of the golf bag are generally supported by the upper and lower brackets on the golf cart. This requires a relatively large space to exist between the upper and lower brackets of the golf cart which, in turn, causes difficulties with storage and/or transportation of the golf cart.

Existing golf carts typically consist of a chassis, a main rod, a front wheel assembly, and a rear wheel assembly. Since the chassis is generally a singular pipe structure, the front wheel assembly is installed on the front end thereof, such that the front wheels cannot be retracted into the chassis, but rather fold toward the rear wheels. As a result, conventional golf carts typically occupy a relatively large area and are rather difficult to fold.

SUMMARY

It is an object of the present invention to provide a front-folding golf cart that overcomes the deficiencies of existing technology. In particular, the present invention aims to provide a front-folding golf cart that has a simple, easy-to-use, and space-saving structural design.

The technical solutions adopted in the utility model to achieve the aforementioned objectives are described below.

According to an exemplary embodiment, a front-folding golf cart may include a main rod, a handle, and a front wheel assembly rotatably connected to an end of the main rod and moveable between an extended position and a retracted position. The rotation of the front wheel assembly, from the extended to retracted position, may occur in a forward-and-upward (i.e., clockwise) direction. The front wheel assembly may include at least one front wheel fork having a front wheel mounted thereto, a support chassis extending from the main rod to the front wheel fork, and a locking mechanism positioned therebetween at a connecting portion. An end of the front wheel fork may fixedly attach, or be welded to, the connecting portion, such that the front wheel fork is connected to the main rod via the locking mechanism. A lower bracket may fixedly attach to the support chassis. In some exemplary embodiments, the lower bracket may be fastened to the support chassis with screws. Alternately, or in addition to, the lower bracket may be secured to the support chassis via a snap-lock connection. The support chassis may rotatably attach to the main rod via an adjustable screw connection that enables a locking operation of the front wheel assembly after an upward rotation thereof. The front-folding golf cart may further include two rear wheels respectively connected to the main rod through two foldable rear wheel frames. The rotation of the rear wheel frames may occur in a forward-and-upward direction, toward the front wheel assembly.

In some exemplary embodiments, the locking mechanism may include a support insert slidably receivable within a frame of the support chassis, and fixed to the connecting portion of the front wheel fork. The support insert may have at least one mounting groove formed on a surface thereof. An elastic member may be positioned within the mounting groove. A lever may operatively connect to the support insert at one end, the lever being moveable between a clamped position and an unclamped position. The unclamped position may permit translational movement of the support insert relative to the frame.

In some exemplary embodiments, the support chassis and the main rod may connect via a snap-lock connection. In other exemplary embodiments, the support chassis and the main rod may attach via a bolted connection, wherein each respective end is provided with a bolt penetration hole for securing an adjustable locking bolt therethrough.

In some exemplary embodiments, the front wheel fork may form a substantially U-shaped structure.

In some exemplary embodiments, the handle may hingedly connect to the main rod and be foldable in a direction toward the rear wheels.

In some exemplary embodiments, the bolted connection may include an internally threaded nut that adjustably engages, and fastens, the bolt. The nut component may be constructed of plastic materials.

In some exemplary embodiments, the elastic member may include a spring.

The front-folding golf cart may provide a simple, easy-to-use structural design having a flexible, rotational connection between a single main rod and supporting chassis. This rotational connection, along with the locking mechanism, may enable a more convenient folding operation and more flexible front wheel steering. The front wheel assembly may also be retracted into the main rod for smaller folding volume and more convenient transport.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

Figure 1:
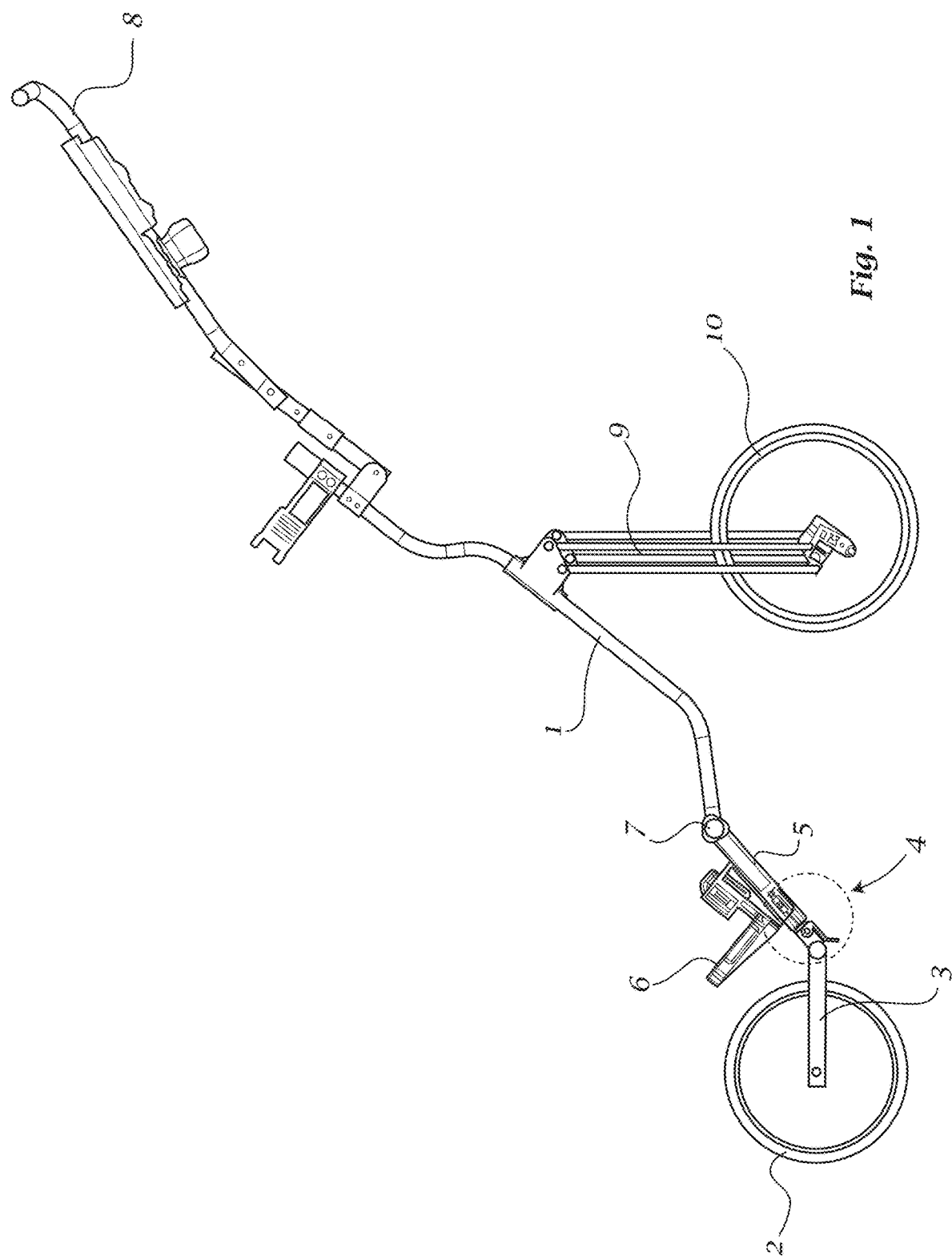
FIG. 1 is a schematic diagram illustrating an exemplary embodiment of a front-folding golf cart in accordance with the present invention.
Figure 2:
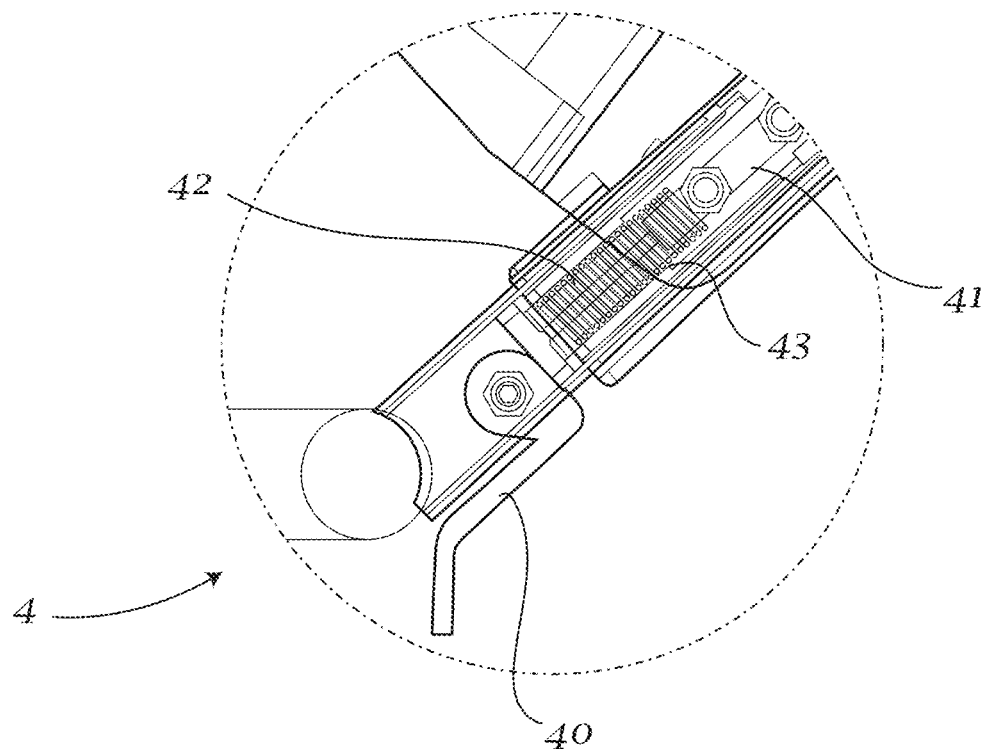
FIG. 2 is partially enlarged view of the locking mechanism illustrated in FIG. 1.
Figure 3:
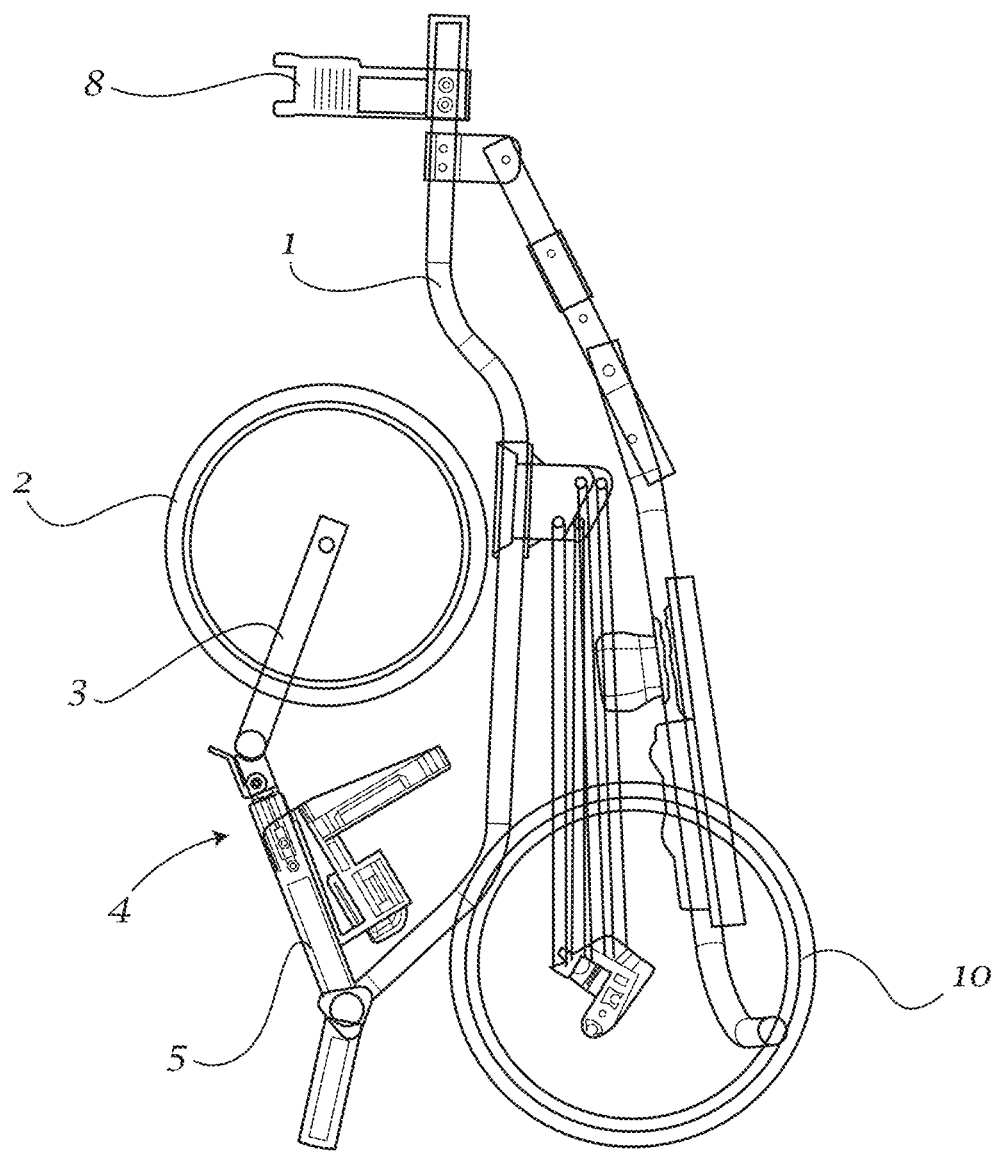
FIG. 3 is a schematic diagram illustrating an exemplary embodiment of a front-folding golf cart in a folded configuration.

FIGS. 1-3 may illustrate an exemplary front-folding golf cart in accordance with an embodiment of the present invention. As shown in FIGS. 1-3, the front-folding golf cart may include a main rod 1, a handle 8, and a front wheel assembly rotatably connected to an end portion of the main rod 1 such that a front wheel 2 may rotate relative thereto. A folding action of the front wheel 2 may occur in a forward-and-upward direction. The front-folding golf cart may further include rear wheels 10 respectively mounted to the main rod 1 through foldable rear wheel frames 9. The rotation of the foldable rear wheel frames 9 may cause the rear wheels 10 to collapse toward the front wheel 2 of the main rod 1.

The front wheel assembly may include a supporting chassis 5 and at least one front wheel 2 mounted on a front wheel fork 3. The front wheel fork 3 may form a substantially U-shaped structure having a rear portion fixedly attached to a connecting portion, such as through a welded or a bolted connection. The connecting portion may support, or attach to, a locking mechanism 4. The front wheel fork 3 may thus connect to the supporting chassis 5 through the locking mechanism 4. A lower bracket 6 may fixedly attach to the supporting chassis 5 through screws. The supporting chassis 5 may rotatably connect to the main rod 1 through an adjustable bolt connection 7, enabling fastening and locking of the front wheels 2 in a folded configuration. The bolt connection 7 may be formed of rubber components.

As shown in FIG. 2, the locking mechanism 4 may include an actuatable lever 40 and a support insert 41 fixed to the connecting portion of the front wheel fork 3. The support insert 41 may slidably mount within a frame of the support chassis 5. The lever 40 may be proximate one end of the support insert 41. The support insert 41 may have one or more mounting grooves 43 formed on a surface thereof. An elastic member 42 may be positioned within the mounting groove 43 for engaging the frame of the support chassis 5. The lever 40 may operatively connect to the support insert 41, the lever 40 being moveable between a clamped position and an unclamped position. The clamped position of the lever 40 may secure the support insert 41 in place, while the unclamped position of the lever 40 may permit translational movement of the support insert 41 relative to the frame. The elastic member 42 may have a cushioning and/or buffering effect.

In some exemplary embodiments, the support chassis 5 and the main rod 1 may be fixed by a snap-lock connection. In other exemplary embodiments, the support chassis 5 and the main rod 1 may attach via an adjustable bolt connection 7, wherein each respective end is provided with a bolt penetration hole for securing an adjustable locking bolt therethrough. The bolted connection 7 may include an internally threaded nut that adjustably engages, and fastens, the bolt. The nut component may be constructed of plastic materials. The handle 8 may be hinged to the main rod 1 and foldable in a direction of the rear wheels 10. The elastic member 42 may include at least one spring.

In operation, the front wheel 2 may be folded upward, toward the main rod 1, through a pulling action of the lever 40, which enables a spring rebound of the support insert 41. The adjustable screw of the bolted connection 7 may then be tightened, after collapsing the front wheels 2 inward, to securely hold the folded configuration of the front-folding golf cart. This configuration may enable a more convenient folding operation, a substantially smaller folded volume, more flexible front wheel steering, and convenient storage and transportation.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments may be made by those skilled in the art without departing from the scope of the invention as defined by the following claims.

What is claimed is:

1. A front-folding golf cart comprising:
    a main rod having a first end and a second end;
    a handle rotatably attached to the first end of the main rod;
    a front wheel assembly rotatably attached to the second end of the main rod, the front wheel assembly further comprising a front wheel fork having a front wheel mounted thereto; a support chassis extending from the second end of the main rod to the front wheel fork; and a locking mechanism positioned therebetween;
    a lower bracket connected to the support chassis, the lower bracket being configured to secure a bottom portion of a golf bag; and
    two rear wheels respectively connected to the main rod through two rear wheel frames;
    wherein rotation of the front wheel assembly, from an extended position to a retracted position, occurs in a clockwise direction.

2. The front-folding golf cart of claim 1, wherein the locking mechanism further comprises:
    a support insert slidably receivable within a frame of the support chassis, the support insert having one end thereof fixed to the front wheel fork;
    at least one mounting groove formed on a surface of the support insert;
    an elastic member positioned within the mounting groove; and
    a lever operatively connected to the support insert.

3. The front-folding golf cart of claim 1, wherein the front wheel fork is substantially U-shaped.

4. The front-folding golf cart of claim 1, wherein the handle rotates in a direction toward the rear wheels.

5. The front-folding golf cart of claim 2, wherein the elastic member comprises a spring.

\* \* \* \* \*